US012725505B2

(12) United States Patent
Hamada et al.

(10) Patent No.: US 12,725,505 B2
(45) Date of Patent: Sep. 1, 2026

(54) PRESENTATION CONTROL DEVICE, INFORMATION PRESENTATION SYSTEM, PRESENTATION CONTROL METHOD, AND STORAGE MEDIUM STORING PRESENTATION CONTROL PROGRAM

(71) Applicant: Mitsubishi Electric Corporation, Tokyo (JP)

(72) Inventors: Masaki Hamada, Tokyo (JP); Yasunori Tsubaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 26 days.

(21) Appl. No.: 18/813,800

(22) Filed: Aug. 23, 2024

(65) Prior Publication Data

US 2024/0412614 A1 Dec. 12, 2024

Related U.S. Application Data

(63) Continuation of application No. PCT/JP2022/015016, filed on Mar. 28, 2022.

(51) Int. Cl.
*G08B 21/04* (2006.01)

(52) U.S. Cl.
CPC ..... *G08B 21/0476* (2013.01); *G08B 21/0469* (2013.01)

(58) Field of Classification Search
CPC ............ G08B 21/0476; G08B 21/0469; G08B 21/02; G08B 25/00; G08B 25/04; G06F 16/9038
See application file for complete search history.

(56) References Cited

U.S. PATENT DOCUMENTS 5,838,238 A * 11/1998 Abita .................... A61H 3/061 340/407.1
5,933,082 A * 8/1999 Abita .................... G08B 21/02 250/338.1

(Continued)

FOREIGN PATENT DOCUMENTS

JP 2016-94027 A 5/2016
JP 2018-197023 A 12/2018

(Continued)

OTHER PUBLICATIONS

International Search Report, issued in PCT/JP2022/015016, PCT/ISA/210, dated Jun. 21, 2022.

(Continued)

*Primary Examiner* — Curtis J King
(74) *Attorney, Agent, or Firm* — Birch, Stewart, Kolasch & Birch, LLP

(57) ABSTRACT

A presentation control device includes a risk calculation unit to acquire input information indicating situations where a group of object persons in a monitoring region is placed, and to calculate a risk level; a notification determination unit to determine presentation contents indicating contents of a warning, a presentation method, and the group of the object persons, based on the risk level of each of the object persons; a presentation control unit to make a presentation device determined based on the presentation method and the group present the presentation contents; and a response acquisition unit to acquire responsive action information indicating actions of the group immediately after the presentation of the presentation contents from a responsive action detector detecting actions of the object persons in the monitoring region, wherein the notification determination unit updates the presentation contents, the presentation method, the (Continued)

group, and presentation device, based on the responsive action information.

10 Claims, 10 Drawing Sheets

(56) References Cited

U.S. PATENT DOCUMENTS

| | | | | |
|---|---|---|---|---|
| 7,263,379 | B1 * | 8/2007 | Parkulo | G08B 25/009 370/254 |
| 9,685,060 | B2 * | 6/2017 | Mantsvetov | G08B 21/02 |
| 10,292,036 | B1 * | 5/2019 | Robinson | H04W 4/12 |
| 2005/0200453 | A1 * | 9/2005 | Turner | G07C 9/257 340/10.41 |
| 2007/0011286 | A1 * | 1/2007 | Trinkel | H04Q 3/0091 709/223 |
| 2007/0040669 | A1 * | 2/2007 | Boucher | G08B 27/006 340/539.11 |
| 2007/0135090 | A1 * | 6/2007 | Martin | H04W 4/90 455/404.2 |
| 2007/0241913 | A1 * | 10/2007 | Langenfeld | A01M 31/00 340/573.2 |
| 2008/0218331 | A1 * | 9/2008 | Baillot | G08B 21/02 340/521 |
| 2015/0189068 | A1 * | 7/2015 | Mohan | H04L 67/125 455/420 |
| 2017/0060130 | A1 * | 3/2017 | Kim | H04W 4/80 |
| 2017/0124276 | A1 | 5/2017 | Tee | |
| 2017/0148306 | A1 * | 5/2017 | Wolfson | H04W 4/02 |
| 2018/0096588 | A1 * | 4/2018 | Shabah | G06Q 50/265 |
| 2019/0019401 | A1 * | 1/2019 | Han | G08B 25/14 |
| 2019/0325733 | A1 * | 10/2019 | Wright | G06F 3/0482 |
| 2020/0364819 | A1 * | 11/2020 | de Hoog | G06Q 90/205 |
| 2021/0182604 | A1 * | 6/2021 | Anthony | G08G 1/012 |
| 2021/0182605 | A1 * | 6/2021 | Anthony | G06N 3/084 |

FOREIGN PATENT DOCUMENTS

| | | | |
|---|---|---|---|
| JP | 2019-503017 | A | 1/2019 |
| JP | 2019-125254 | A | 7/2019 |
| JP | 2021-60774 | A | 4/2021 |

OTHER PUBLICATIONS

Notice of Reasons for Refusal for Japanese Application No. 2022-574297, dated Feb. 21, 2023.

* cited by examiner

PRESENTATION CONTROL DEVICE, INFORMATION PRESENTATION SYSTEM, PRESENTATION CONTROL METHOD, AND STORAGE MEDIUM STORING PRESENTATION CONTROL PROGRAM

CROSS-REFERENCE TO RELATED APPLICATION

This application is a continuation application of International Application No. PCT/JP2022/015016 having an international filing date of Mar. 28, 2022.

BACKGROUND OF THE INVENTION

1. Field of the Invention

The present disclosure relates to a presentation control device, an information presentation system, a presentation control method and a presentation control program.

2. Description of the Related Art

There has been proposed a warning device including a position detection unit that detects the position of a mobile object (e.g., pedestrian) moving in a station, a situation judgment unit that judges a situation in the station based on detection information obtained by the position detection unit, and a notification unit that makes a notification with a warning level varied depending on the result of the judgment by the situation judgment unit (see Patent Reference 1, for example). The Patent Reference 1 discloses a method of changing the warning level according to a standard previously set in regard to each station.

Patent Reference 1: Japanese Patent Application Publication No. 2018-197023 (see claims 1 to 3 and paragraphs 0008 to 0019, for example).

In the above-described conventional device, there is a problem in that it is impossible to present an appropriate warning corresponding to the situation of an object person even though a warning based on the previously set standard can be issued.

SUMMARY OF THE INVENTION

An object of the present disclosure is to present an appropriate warning to an object person in a monitoring region.

A presentation control device in the present disclosure includes processing circuitry to acquire input information indicating situations where a group of object persons in a monitoring region is placed, and to calculate a risk level representing a degree of dangerousness of a situation where each of the object persons is placed based on the input information; to determine presentation contents indicating contents of a warning to the group, a presentation method indicating a method of the warning to the group, and the group of the object persons who should be notified of the warning, based on the risk level of each of the object persons; to make a presentation device determined based on the presentation method and the group present the presentation contents; and to acquire information indicating actions of the group immediately after the presentation of the presentation contents, as responsive action information, from a responsive action detector detecting actions of the object persons in the monitoring region, wherein the processing circuitry updates the presentation contents, the presentation method, the group, and presentation device, based on the responsive action information.

A presentation control method in the present disclosure is a method to be executed by a presentation control device. The presentation control method includes acquiring input information indicating situations where a group of object persons in a monitoring region is placed, and to calculate a risk level representing a degree of dangerousness of a situation where each of the object persons is placed based on the input information; determining presentation contents indicating contents of a warning to the group, a presentation method indicating a method of the warning to the group, and the group of the object persons who should be notified of the warning, based on the risk level of each of the object persons; making a presentation device determined based on the presentation method and the group present the presentation contents; acquiring information indicating actions of the group immediately after the presentation of the presentation contents, as responsive action information, from a responsive action detector detecting actions of the object persons in the monitoring region; and updating the presentation contents, the presentation method, the group, and presentation device, based on the responsive action information.

According to the present disclosure, an appropriate warning can be presented to the object person in the monitoring region.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A presentation control device, an information presentation system, a presentation control method and a presentation control program according to each embodiment will be described below with reference to the drawings. The following embodiments are just examples and it is possible to appropriately combine embodiments and appropriately modify each embodiment.

(1) First Embodiment

Figure 1:
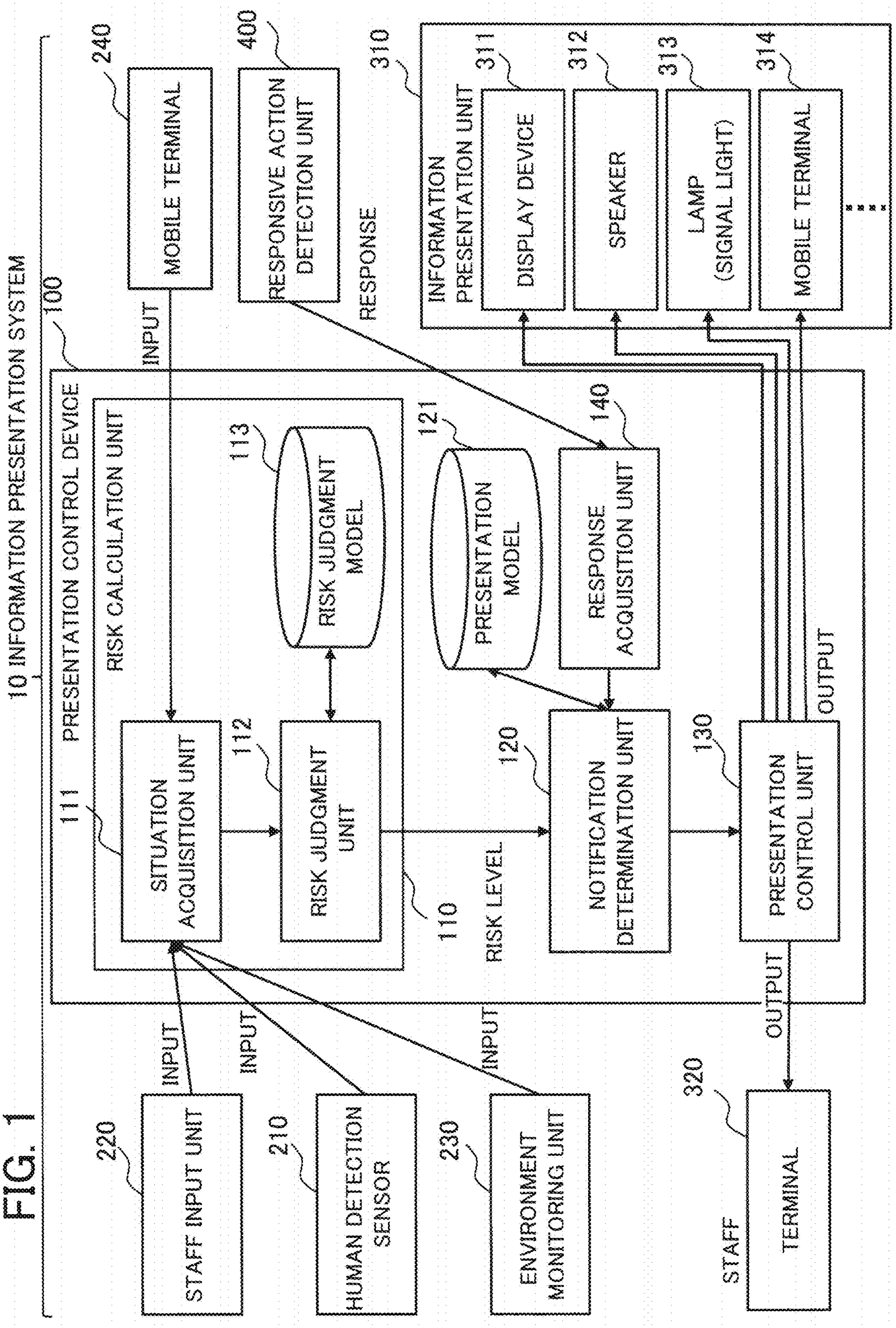
FIG. 1 is a block diagram schematically showing the configuration of a presentation control device and an information presentation system according to a first embodiment.
Figure 2:
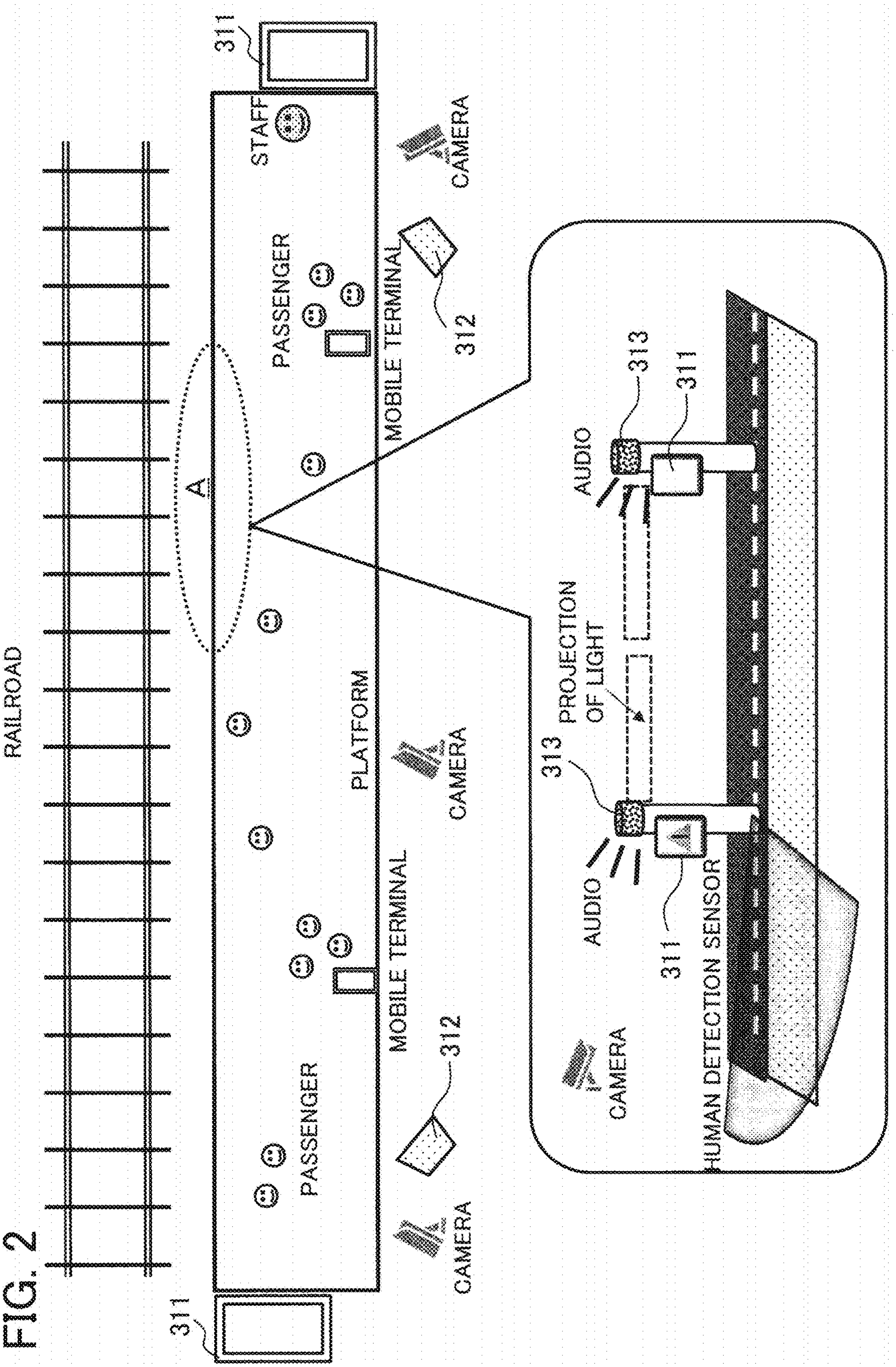
FIG. 2 is a plan view (including a perspective view of a part A) schematically showing a configuration example of the information presentation system (an example in which a monitoring region is a platform of a station)

FIG. 1 is a block diagram schematically showing the configuration of a presentation control device 100 and an information presentation system 10 according to a first embodiment. FIG. 2 is a plan view (including a perspective view of a part A) schematically showing a configuration example of the information presentation system 10 (an example in which a monitoring region is a platform of a station). The presentation control device 100 is a device capable of executing a presentation control method according to the first embodiment. FIG. 1 and FIG. 2 will be used also for descriptions of second to sixth embodiments given later.

As shown in FIG. 1, the presentation control device 100 includes a risk calculation unit 110, a notification determination unit 120, a presentation control unit 130 and a response acquisition unit 140. The information presentation system 10 includes the presentation control device 100, various types of situation input devices (e.g., a human detection sensor 210, a staff input unit 220, an environment monitoring unit 230 as an environment monitoring device, a mobile terminal 240, and so forth) that provide input information to the presentation control device 100, an information presentation unit 310 (e.g., a display device 311 such as a signage or a digital signage, a speaker 312 as an audio output unit, a lamp 313 as a signal light, a mobile terminal 314, and so forth), and a responsive action detection unit (i.e., a responsive action detector or a responsive action detecting circuit) 400.

The risk calculation unit 110 acquires the input information indicating the situation in the monitoring region and calculates a risk level (i.e., danger level) representing the degree of dangerousness of the situation where people (i.e., one or more persons) in the monitoring region are placed, based on the input information. For example, the risk calculation unit 110 acquires input information indicating situations where a group of object persons in a monitoring region is placed, and calculates the risk level representing a degree of dangerousness of a situation where each of the object persons is placed based on the input information. A group of object persons is also represented by a object people (group) or a group of object people. The risk calculation unit 110 includes a situation acquisition unit 111, a risk judgment unit 112 and a risk judgment model 113, for example. The "monitoring region" is, for example, a region on a platform of a station that is used by passengers for entering and exiting from a train as public transportation. The "a person or persons in the monitoring region" namely "people in the monitoring region" are, for example, passengers moving on the platform of the station. The "risk level" is represented by a high numerical value when a passenger moving on the platform is walking at a position close to an edge of the platform (i.e., a position where the dangerousness of falling onto a railroad is high) and occurrence probability of falling onto the railroad is high, for example. Further, the "risk level" is represented by a high numerical value when a passenger moving on the platform is walking while viewing a smartphone and the occurrence probability of falling onto the railroad is high, for example.

The situation acquisition unit 111 acquires the input information indicating the situation in the monitoring region from the various types of situation input devices providing the input information. The input information is acquired from the human detection sensor 210 as an object detection unit and the staff input unit 220 such as an operation panel operated by a staff such as a station employee (i.e., a station staff), for example. The human detection sensor 210 is, for example, a monitoring camera as an image capturing device, a distance sensor that detects an object, or the like. The input information may include environment information provided from the environment monitoring unit that measures the environment such as weather, date and time (i.e., date/time), and atmospheric temperature. Further, the input information may include information transmitted from the mobile terminal 240 such as a smartphone of a passenger. The situation acquisition unit 111 can also acquire one item of information or a combination of two or more items of information out of monitoring information obtained by a device (e.g., a video from a monitoring camera, a detection signal from the human detection sensor, train approach information, or the like), monitoring information obtained by a human operation (e.g., information regarding the presence or absence (presence/absence) of a staff member of a facility, information provided from a general passenger, information regarding an event that occurred in the past in a similar situation in a similar station, or the like), and an environmental condition (weather, date and time, or the like).

The situation acquisition unit 111 may assign reliability of each item of input information to the input information by judging the situation in the station. As the reliability, a value determined based on accuracy obtained from results of detection by AI (Artificial Intelligence) or based on track records of information presentation to passengers or the like is used, for example. Examples of information with high reliability include information provided from a staff member, emergency information provided by using an emergency call device in the station, and so forth. For example, when an object person of a notification is judged to be a person with a white walking stick (i.e., a person with visual impairment) based on a video from a monitoring camera, the reliability of the information based on the camera video is set at a high value (e.g., 80%). When the information inputted to the situation acquisition unit 111 is information indicating that an emergency button in the station has been operated (e.g., notification of occurrence of a sudden illness), the reliability of the information is set at the highest value (e.g., 100%). When the information inputted to the situation acquisition unit 111 is delay information provided from a mobile terminal of a passenger, the reliability of the information is set at a relatively low value (e.g., 50%). It is also possible for the situation acquisition unit 111 to pass on the input information to the risk judgment unit 112 without assigning the reliability to the input information (i.e., while regarding all reliability values as the same value).

The risk judgment unit 112 determines the risk level by referring to a risk judgment model based on the reliability of the information from the situation acquisition unit 111. The calculation of the risk level is performed by, for example, weighting each of the values (scores) of various types of input information by a higher value with the increase in the reliability of the information and calculating the weighted average. Further, as another method for calculating the risk level (i.e., dangerousness score), there is a method of calculating the score by using a generic statistical method. The risk judgment model is a model storing information indicating what kind of danger is anticipated depending on the type of the input information. The risk judgment model can be either a model constructed by a rule-based method or a learned model previously constructed by using publicly known machine learning algorithm. The risk judgment unit 112 may also be configured to output information regarding the risk level while attaching a confidence rating, as an index representing an importance level of an association rule, to the risk level information outputted.

The notification determination unit 120 determines presentation contents indicating the contents of a warning, a presentation method indicating the method of the warning, and object people (i.e., an object person or object persons) who should be notified of the warning among the object persons in the monitoring region (i.e., notification range of the warning) based on the risk level acquired from the risk judgment unit 112. For example, the notification determination unit 120 determines presentation contents indicating contents of a warning to the group, a presentation method indicating a method of the warning to the group, and the group of the object persons who should be notified of the warning, based on the risk level of each of the object persons. When there is an input of responsive action information from the response acquisition unit 140, the notification determination unit 120 determines (i.e., updates) the presentation contents indicating the contents of the warning, the presentation method indicating the method of the warning, and the object people who should be notified of the warning among the persons in the monitoring region based on the risk level acquired from the risk judgment unit 112 and the responsive action information acquired from the response acquisition unit 140. The responsive action information is information indicating responsive actions of the object people immediately after the presentation of the warning. Here, the presentation contents and the presentation method are changed based on a warning level. The object people that should be notified of the warning are changed based on the notification range of the warning. The notification range can be an individual being a passenger, a group including the individual and passengers in the vicinity of the individual, or the like. A presentation model of warning information is a model storing information for outputting that executing presentation of what kind of warning information to what kind of notification range (e.g., a particular person or a group of object persons) is effective depending on the risk level and the responsive action information from the response acquisition unit 140 (i.e., result of response of people) in response to the presentation of the warning information. The presentation model can be either a model constructed by a rule-based method or a learned model previously constructed by using publicly known machine learning algorithm.

The presentation control unit 130 outputs a signal for making a presentation device of the information presentation unit 310 present the received presentation contents. For example, the presentation control unit 130 makes the presentation device determined based on the presentation method and the group present the presentation contents. The presentation device can be, for example, the display device 311 such as a digital signage formed with a liquid crystal display, the speaker 312 as the audio output unit, the lamp 313 as a light emission unit of a variety of color that transmits information by means of lighting, extinction, blinking, etc., the mobile terminal 314 such as a smartphone carried by a person such as a passenger, or the like. The presentation control unit 130 presents the warning information to a passenger, people in the vicinity of the passenger, or the like through the device (digital signage, speaker, or the like) based on the warning level and the result of the judgment on the notification range. The mobile terminal 314 can also be a wearable device such as AR (Augmented Reality) glasses. The display device 311 can also be a projector that projects an image onto the floor surface of the platform, bodies of passengers, or the like. Presentation information that is provided to the mobile terminal 314 may also be notified of in a form such as a posting to a social networking service (SNS) as a membership service on a website where registered users can interact with each other.

The response acquisition unit 140 acquires information indicating actions of the object people immediately after the presentation of the presentation contents, as the responsive action information, from the responsive action detection unit 400 detecting actions of the people in the monitoring region. For example, the response acquisition unit 140 acquires information indicating actions of the group of the object persons immediately after the presentation of the presentation contents, as responsive action information, from the responsive action detector detecting actions of the object persons in the monitoring region. In other words, the response acquisition unit 140 acquires the responsive actions of the people who viewed or heard the presented warning information by means of image analysis, sensing by a sensor, or the like and judges whether or not the actions of the people changed at the time of the presentation of the warning information. The responsive action can be, for example, rapidly changing the direction of the face, greatly changing a moving direction, stopping walking, turning around to face the direction of a signage, moving to a central part of the platform, stopping using a smartphone while walking, taking off headphones, looking around, and so forth.

The notification determination unit 120 updates the presentation contents, the presentation method and the object people based on the information acquired from the response acquisition unit 140. For example, the notification determination unit 120 updates the presentation contents, the presentation method, the group of the object persons, and presentation device, based on the responsive action information. For example, when a predetermined responsive action is not detected in the object people after (especially, immediately after) the warning presentation even though a warning is presented to the object people, the notification determination unit 120 raises the warning level and presents the warning with stronger contents or a stronger presentation method. The stronger contents mean presenting the warning with a stronger expression (e.g., imperative expression) when the first presentation information is presented with an expression to ask a favor of the object people. The stronger presentation method means a method of performing the presentation by using both of audio and visual when the first presentation was performed by using one of audio and visual. Examples of the stronger presentation method include raising the volume level of the warning, increasing the luminance of the image displayed by the display device, displaying an image with conspicuous colors, shortening the cycle of the blinking of the lamp, and so forth. That is, the warning level is a numerical value representing the strength of the warning, and a higher value represents a stronger warning.

Figure 3:
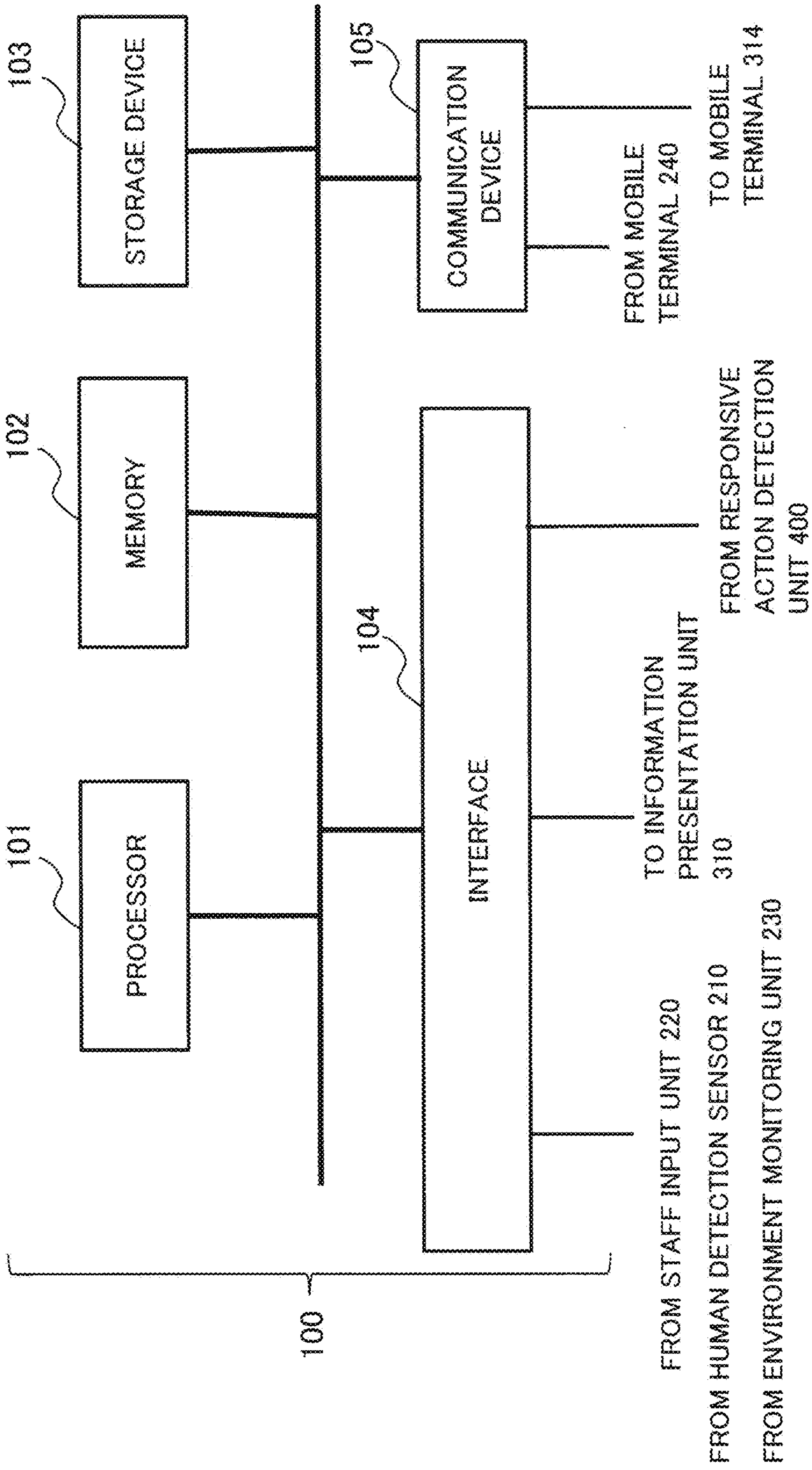
FIG. 3 is a diagram showing an example of the hardware configuration of the presentation control device according to the first embodiment.

FIG. 3 is a diagram showing an example of the hardware configuration of the presentation control device 100 according to the first embodiment. The presentation control device 100 is a computer, for example. The presentation control device 100 is a device capable of executing a presentation control program according to the first embodiment. The presentation control device 100 includes a processor 101 and a memory 102 as a volatile storage device. The presentation control device 100 may include a nonvolatile storage device 103 such as a hard disk drive (HDD) or a solid state drive (SSD), an interface 104, and a communication device 105 that executes communication with external devices. The memory 102 is, for example, a semiconductor memory such as a RAM (Random Access Memory). The presentation control device 100 may be configured to execute the presentation control program as a software program installed from a record medium or via a communication line and stored in the memory 102. The record medium is a non-transitory computer-readable storage medium storing a program such as the presentation control program.

The functions of the presentation control device 100 are implemented by a processing circuit. The processing circuit can be either dedicated hardware or the processor 101 executing the presentation control program stored in the memory 102. The processor 101 can be any one of a processing device, an arithmetic device, a microprocessor, a microcomputer and a DSP (Digital Signal Processor).

In the case where the processing circuit is dedicated hardware, the processing circuit is an ASIC (Application Specific Integrated Circuit), an FPGA (Field Programmable Gate Array) or the like, for example.

It is also possible to implement part of the presentation control device 100 by dedicated hardware and other part of the presentation control device 100 by software or firmware. As above, the processing circuit is capable of implementing the above-described functions by hardware, software, firmware, or a combination of some of these means.

Figure 4:
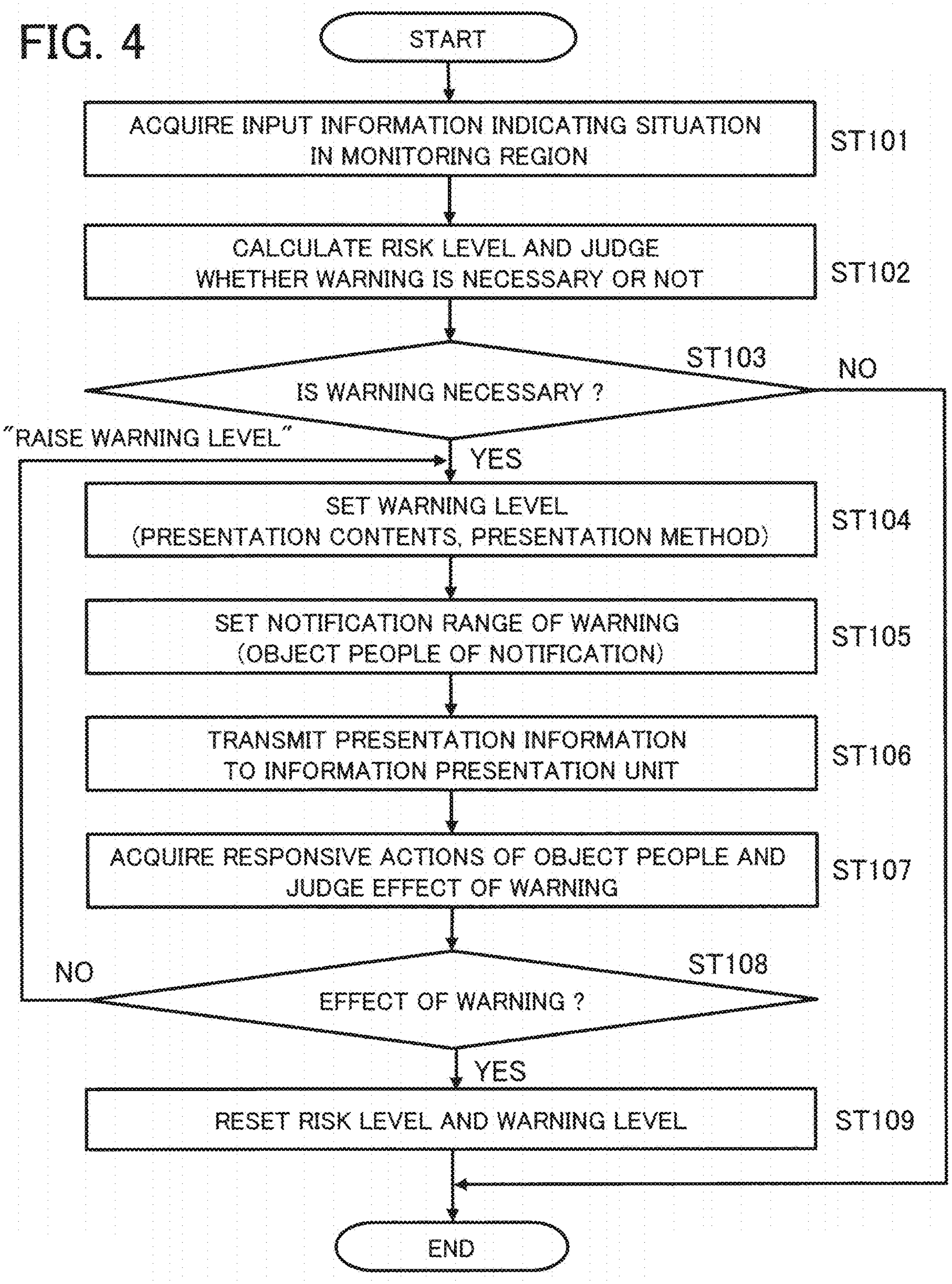
FIG. 4 is a flowchart showing the operation (presentation control method) of the presentation control device according to the first embodiment.

FIG. 4 is a flowchart showing the operation (presentation control method) of the presentation control device 100 according to the first embodiment. In the first embodiment, the risk calculation unit 110 acquires the input information indicating the situation in the monitoring region (step ST101), calculates the risk level representing the degree of dangerousness of the situation where the people in the monitoring region are placed, based on the input information, and judges whether the warning is necessary or not based on the risk level (step ST102). If the warning is unnecessary (NO in step ST103), the process for presenting the warning ends. If the warning is necessary (YES in the step ST103), the process advances to step ST104.

Subsequently, the notification determination unit 120 determines the warning level (including the presentation contents indicating the contents of the warning and the presentation method indicating the method of the warning) and the notification range of the warning (the object people who should be notified of the warning among the people in the monitoring region) based on the risk level (steps ST104 and ST105).

Subsequently, the presentation control unit 130 makes the presentation device determined based on the presentation method and the object people (e.g., the display device 311, the speaker 312, the lamp 313, the mobile terminal 314 or the like) present the presentation contents (step ST106).

Subsequently, the response acquisition unit 140 acquires the information indicating the actions of the object people immediately after the presentation of the presentation contents, as the responsive action information, from the responsive action detection unit 400 detecting the actions of the people in the monitoring region, and the notification determination unit 120 judges the presence/absence of effect of the warning based on the responsive action information (step ST107). If desired effect of the warning is obtained (YES in step ST108), a process of resetting the risk level and the warning level is executed (step ST109) and the process for presenting the warning is ended. If desired effect is not obtained by the warning (NO in the step ST108), the process returns to the step ST104 and the notification determination unit 120 determines (updates) the warning level (including the presentation contents indicating the contents of the warning and the presentation method indicating the method of the warning) and the notification range of the warning (the object people who should be notified of the warning among the people in the monitoring region) based on the risk level and the responsive action information (steps ST104 and ST105).

According to the first embodiment, an appropriate warning can be presented since the presentation contents and the presentation method of the warning to be presented to the object people in the monitoring region (e.g., passengers on the platform) and the object people of the notification of the warning are set (or changed) based on the responsive actions of the object people immediately after the presentation of the warning. For example, the presentation control device 100 according to the first embodiment can perform the warning presentation for the purpose of lowering the risk level of the object people (e.g., prompting a passenger walking in the vicinity of the edge of the platform to change the walking position by lighting up the lamp) in the first warning and thereafter give a warning through the speaker when there is no change in the passenger's action by the first warning (i.e., when it is judged that there is no responsive action). That is, with the presentation control device 100 according to the first embodiment, a warning is first issued with a gentle expression to make the passenger aware of the risk, and a relatively strong warning is issued when there is no responsive action, by which the risk level of the situation where the passenger is placed can be lowered appropriately while avoiding a feeling of discomfort given to the passenger by an excessive warning.

In other words, according to the first embodiment, the warning level can be raised stepwise. For example, the first warning is automatically issued to an object person unconsciously performing an action with high dangerousness (e.g., walking in the vicinity of the edge of the platform) to prompt the object person to voluntarily lower the risk level (e.g., lighting up a light). When no effect is found, a warning is presented to be recognized also by people around the object person (e.g., the warning is displayed on a signage). When still no effect is found, a notification is sent to the staff (e.g., station employee) to request a warning by a broadcast or a warning by dispatching a staff member to the scene. That is, the strength of the warning can be increased gradually.

Further, according to the first embodiment, when congestion with passengers on the platform is detected in a video from a monitoring camera (when the object people of the warning is a group on the platform), it is possible to guide the group of passengers by presenting information to the group of passengers so that the congestion is dispersed. Further, it is possible to employ a warning presentation method that raises the warning level and raises guidance intensity when the effect is judged to be insufficient based on the responsive actions (e.g., when the congestion on the platform is not eliminated).

Furthermore, according to the first embodiment, when there is a no-entry area (e.g., a construction area, an equipment inspection area or the like) in the monitoring region and entry of a passenger into the no-entry area is detected, a warning is automatically issued to the passenger to prompt the passenger to voluntarily lower the risk level by separating from the no-entry area. According to the first embodiment, when the passenger does not leave the no-entry area, the warning level can be changed depending on the passenger's action acquired by the response acquisition unit. That is, by gradually increasing the strength of the warning, it is possible to make the person who erroneously enter the no-entry area leave the no-entry area without causing too much discomfort.

Moreover, according to the first embodiment, when a warning is presented to an annoying passenger such as a drunk passenger but the warning is found to be ineffective for the drunk passenger, a warning is presented to passengers around the drunk passenger to make them aware of the drunk passenger (e.g., audio from a speaker, warning display on a plurality of digital signages, or the like). When still no effect is found, a notification can be sent to the staff (e.g., station employee) to request a warning by a broadcast or a warning by dispatching a staff member to the scene. As above, the staff's labor can be lightened by gradually increasing the strength of the warning.

(2) Second Embodiment

In a presentation control device according to a second embodiment, the process is changed depending on whether the object (one or more of the object persons) of the notification is an individual or a group. The group is a plurality of persons, and includes an individual and one or more persons in the vicinity of the individual, for example. In the presentation control device according to the second embodiment, a warning at a low warning level is automatically issued to a passenger unconsciously performing an action at a high risk level (e.g., walking in the vicinity of the edge of the platform) to prompt the passenger to voluntarily lower the risk level. When there is still no effect on the object passenger (no change in the action), a warning (e.g., display by a display device) is issued to be recognized by people around the object passenger. When there is still no effect on the object passenger (no change in the action), a broadcast by a staff member or dispatch of a staff member to the scene is carried out.

Figure 5:
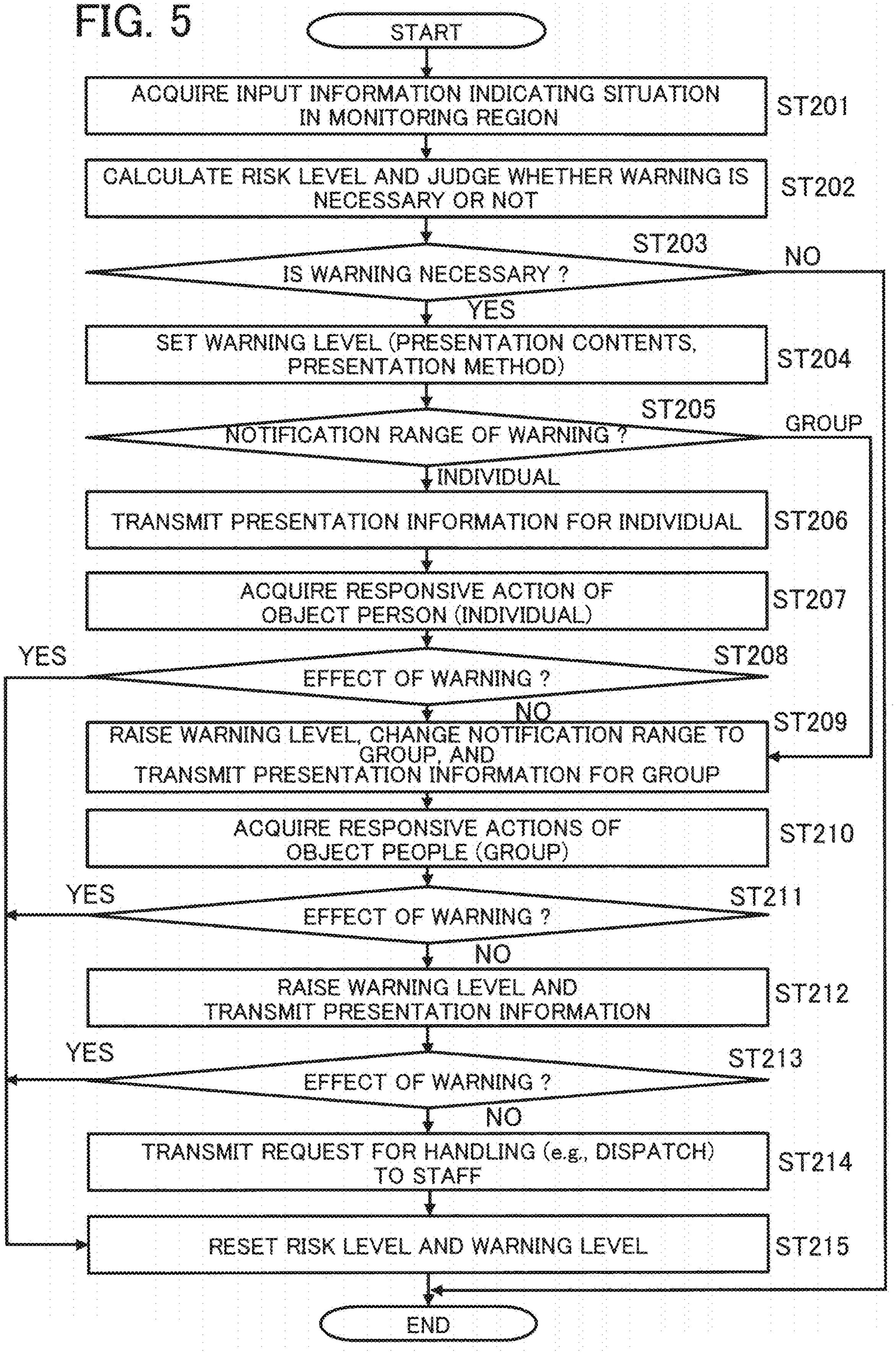
FIG. 5 is a flowchart showing the operation (presentation control method) of a presentation control device according to a second embodiment.

FIG. 5 is a flowchart showing the operation (presentation control method) of the presentation control device according to the second embodiment. In the second embodiment, the risk calculation unit 110 acquires the input information indicating the situation in the monitoring region (step ST201), calculates the risk level representing the degree of dangerousness of the situation where the people in the monitoring region are placed, based on the input information, and judges whether the warning is necessary or not based on the risk level (step ST202). If the warning is unnecessary (NO in step ST203), the process for presenting the warning ends. If the warning is necessary (YES in the step ST203), the process advances to step ST204.

Subsequently, the notification determination unit 120 determines the warning level (including the presentation contents indicating the contents of the warning and the presentation method indicating the method of the warning) based on the risk level (step ST204), and determines whether to set the notification range of the warning (the object person who should be notified of the warning among the people in the monitoring region) as an individual or a group (step ST205).

When the notification range is an individual (when "individual" is selected in the step ST205), the presentation control unit 130 makes the presentation device determined based on the presentation method and the object person (e.g., the display device 311, the speaker 312, the lamp 313, the mobile terminal 314 or the like) present the presentation contents (step ST206). When the notification range is a group (when "group" is selected in the step ST205), the process advances to step ST209. The judgment on whether the notification range is an individual or a group is made based on a camera video or the like.

Subsequently, the response acquisition unit 140 acquires the information indicating the action of the object person immediately after the presentation of the presentation contents, as the responsive action information, from the responsive action detection unit 400 detecting the actions of the people in the monitoring region (step ST207), and the notification determination unit 120 judges the presence/absence of effect of the warning based on the responsive action information (step ST208). If desired effect of the warning is obtained (YES in step ST208), the process of resetting the risk level and the warning level (e.g., lowering the risk level, lowering the warning level, or the like) is executed (step ST215) and the process for presenting the warning ends. If desired effect is not obtained by the warning (NO in the step ST208), the process advances to the step ST209.

In the step ST209, the notification determination unit 120 raises the warning level, changes the notification range to a group, and transmits the presentation information for the group. Subsequently, the response acquisition unit 140 acquires the responsive actions of the object persons (group) (step ST210) and the notification determination unit 120 judges whether or not there is effect of the warning to the object persons (group) (step ST211). If desired effect of the warning is obtained (YES in the step ST211), the process of resetting the risk level and the warning level is executed (step ST215) and the process for presenting the warning ends. If desired effect is not obtained by the warning (NO in the step ST211), the process advances to step ST212.

In the step ST212, the notification determination unit 120 raises the warning level and transmits the presentation information and the response acquisition unit 140 acquires the responsive actions of the object people (step ST212), and the notification determination unit 120 judges whether or not there was effect of the warning to the object people (step ST213). If desired effect of the warning is obtained (YES in the step ST213), the process of resetting the risk level and the warning level is executed (step ST215) and the process for presenting the warning ends. If desired effect is not obtained by the warning (NO in the step ST213), the process advances to step ST214.

In the step ST214, the notification determination unit 120 notifies the staff that there is no effect on the object people (no change in the actions), prompts a broadcast by a staff member or dispatch of a staff member to the scene, thereafter executes the process of resetting the risk level and the warning level (step ST215), and ends the process for presenting the warning.

According to the second embodiment, when there is no effect of the warning to an individual, a warning is issued to a group including the individual or a plurality of persons in the vicinity of the individual, and the presentation contents and the presentation method of the warning to be presented to the object people in the monitoring region (e.g., passengers on the platform) and the object people of the notification of the warning are set (or changed) based on the responsive actions of the object people immediately after the warning. Therefore, it is possible to enhance the safety on the platform and prevent accidents thanks to improvement in manners by voluntary actions of the passengers. Further, by decreasing the number of notifications to the staff, work efficiency of the staff can be improved.

Except for the above-described features, the second embodiment is the same as the first embodiment.

(3) Third Embodiment

In a presentation control device according to a third embodiment, when a passenger at a high handling priority level such as a person with a white walking stick is detected, warning information taking the object person's cognitive capacity into consideration is presented preferentially. Further, in the presentation control device according to the third embodiment, upon detection of a passenger at a high handling priority level such as detection of a person with a white walking stick, the loop of checking the responsive action in response to the notification is exited in the middle and a notification is immediately sent to the staff (e.g., station employee). That is, in the third embodiment, when the responsive action information includes a situation requiring predetermined preferential handling, the notification determination unit 120 makes a request for the dispatch of a staff member.

Figure 6:
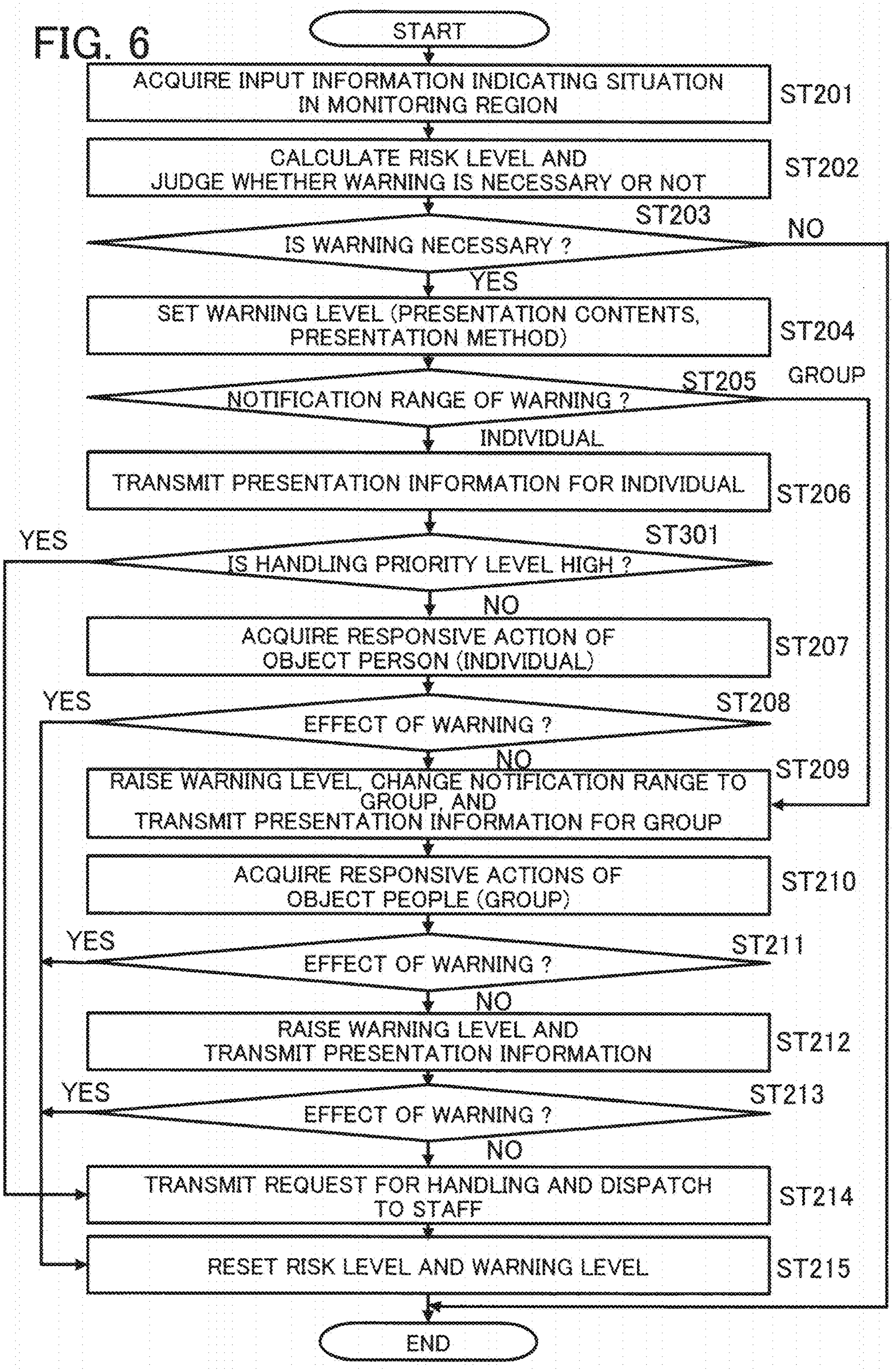
FIG. 6 is a flowchart showing the operation (presentation control method) of a presentation control device according to a third embodiment.

FIG. 6 is a flowchart showing the operation (presentation control method) of the presentation control device according to the third embodiment. In FIG. 6, each step identical or corresponding to a step shown in FIG. 5 is assigned the same reference character as in FIG. 5. In the presentation control device according to the third embodiment, when an individual as the object person who should be notified of the warning is a person with a white walking stick (i.e., a visually impaired person), a broadcast by a staff member or the dispatch of a staff member to the scene is prompted (step ST214), thereafter the process of resetting the risk level and the warning level is executed (step ST215), and the process for presenting the warning is ended. Except for the above-described features, the operation in the third embodiment is the same as the operation in the second embodiment.

According to the third embodiment, it is possible to secure the safety by the presentation of the warning information depending on the property of the object person.

Except for the above-described features, the third embodiment is the same as the second embodiment.

(4) Fourth Embodiment

In a presentation control device according to a fourth embodiment, a method of presentation of a warning by visual presentation information and a method of presentation by auditory presentation information are employed as methods of presenting a warning to the object person. In the fourth embodiment, the warning is presented first by the visual presentation information (e.g., image) and subsequently presentation by the auditory presentation information (e.g., sound from a speaker) is executed; however, this order may also be reversed. In the fourth embodiment, it is possible to issue a warning by visual sensation to an object person showing no response to a warning by audio (e.g., a person wearing earphones or a person who can be hearing-impaired) and issue a warning by audio to an object person showing no response to a warning by visual sensation (e.g., a person viewing a smartphone while walking or a person who can be visually impaired).

Figure 7:
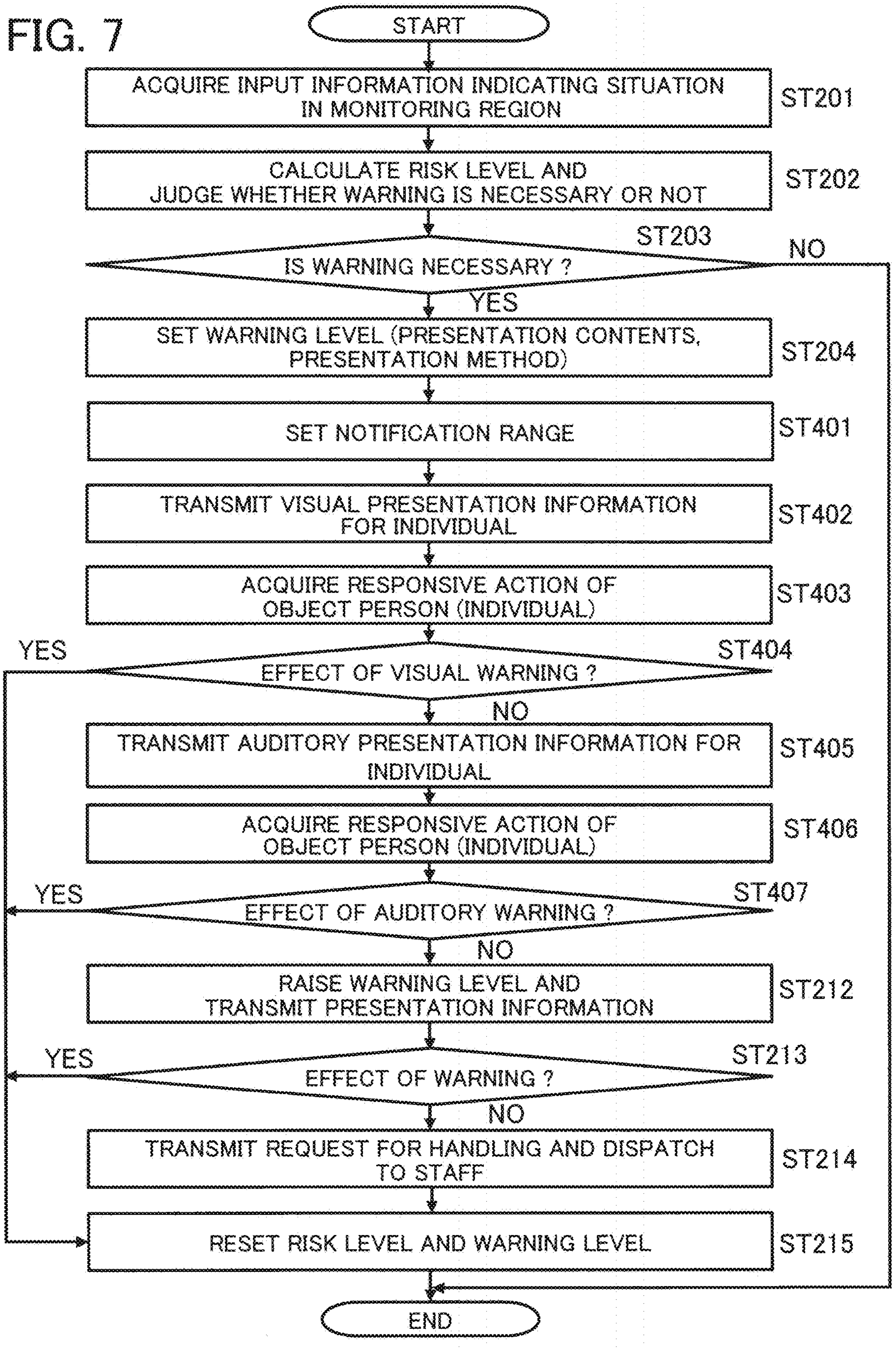
FIG. 7 is a flowchart showing the operation (presentation control method) of a presentation control device according to a fourth embodiment.

FIG. 7 is a flowchart showing the operation (presentation control method) of the presentation control device according to the fourth embodiment. In FIG. 7, each step identical or corresponding to a step shown in FIG. 5 is assigned the same reference character as in FIG. 5. In the presentation control device according to the fourth embodiment, the notification range indicating the object people who should be notified of the warning is set (step ST401), the visual presentation information for an individual is transmitted first (step ST402), and the responsive action of the object person is acquired (step ST403). The notification determination unit 120 judges whether or not there is effect of the warning to the object person, and if desired effect of the warning is obtained (YES in step ST404), the process of resetting the risk level and the warning level is executed (step ST215) and the process for presenting the warning ends. If desired effect is not obtained by the warning (NO in the step ST404), the process advances to step ST405.

In the step ST405, the notification determination unit 120 does not change the notification range indicating the object people who should be notified of the warning and transmits the auditory presentation information. The response acquisition unit 140 acquires the responsive action of the object person (step ST406) and the notification determination unit 120 judges whether or not there is effect of the warning to the object person (step ST407). If desired effect of the warning is obtained (YES in the step ST407), the process of resetting the risk level and the warning level is executed (step ST215) and the process for presenting the warning ends. If desired effect is not obtained by the warning (NO in the step ST407), the process advances to the step ST212.

The processing in the steps ST212 to ST215 is the same as that in the second embodiment.

According to the fourth embodiment, it is possible to secure the safety by the presentation of the warning information depending on the property of the object person.

Except for the above-described features, the fourth embodiment is the same as the second embodiment.

(5) Fifth Embodiment

A presentation control device according to a fifth embodiment differs from the presentation control device according to the second embodiment in that warning content is changed depending on an attribute of the object person of the notification and that advertisement content can be presented to object people who do not need the warning. In the presentation control device according to the fifth embodiment, as the attribute of a passenger in the vicinity of a display device for displaying the warning, an age range (elderly, student, child, etc.), sex, and being a foreigner or not are detected based on a video captured by a monitoring camera, and warning information effective for the object person is presented depending on the attribute of the object person. Further, in the presentation control device according to the fifth embodiment, when the warning presentation is unnecessary, advertisement information is presented by using a signage or the like. It is also possible to mount a camera on a display device for displaying the warning and estimate the attribute of a person by using image sensing technology by AI.

Figure 8:
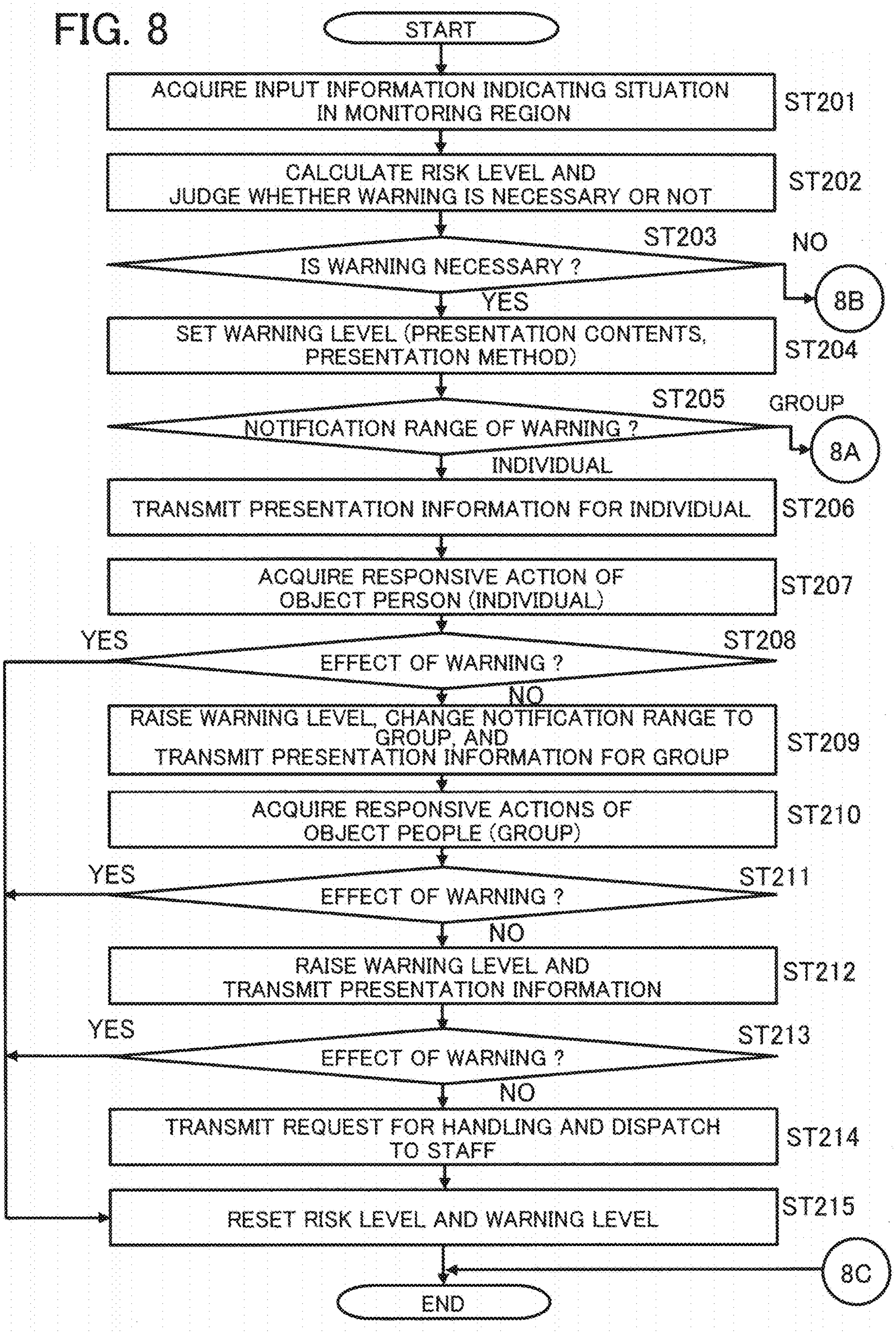
FIG. 8 is a flowchart (part 1) showing the operation (presentation control method) of a presentation control device according to a fifth embodiment.
Figure 9:
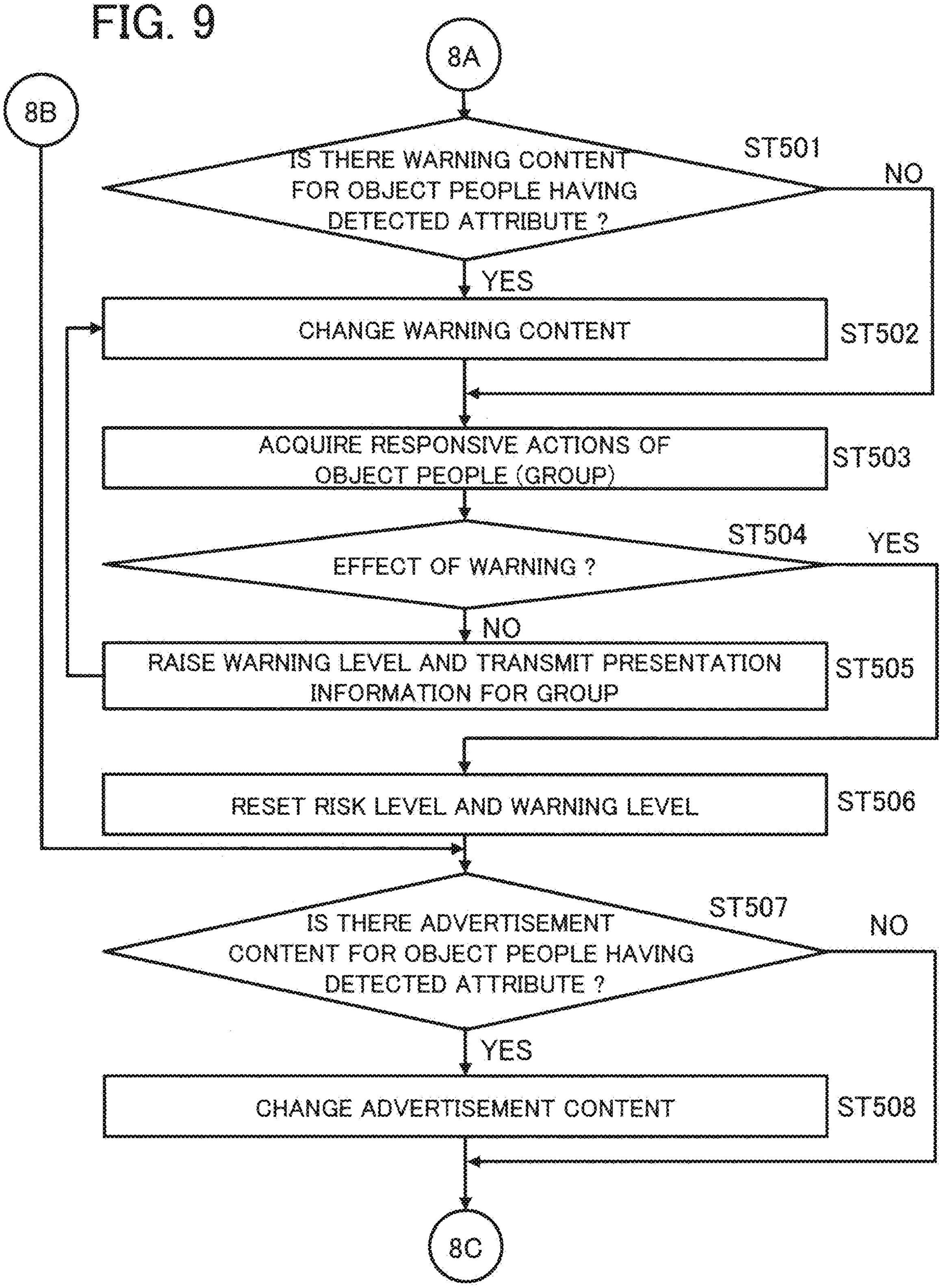
FIG. 9 is a flowchart (part 2) showing the operation (presentation control method) of the presentation control device according to the fifth embodiment.
Figure 10:
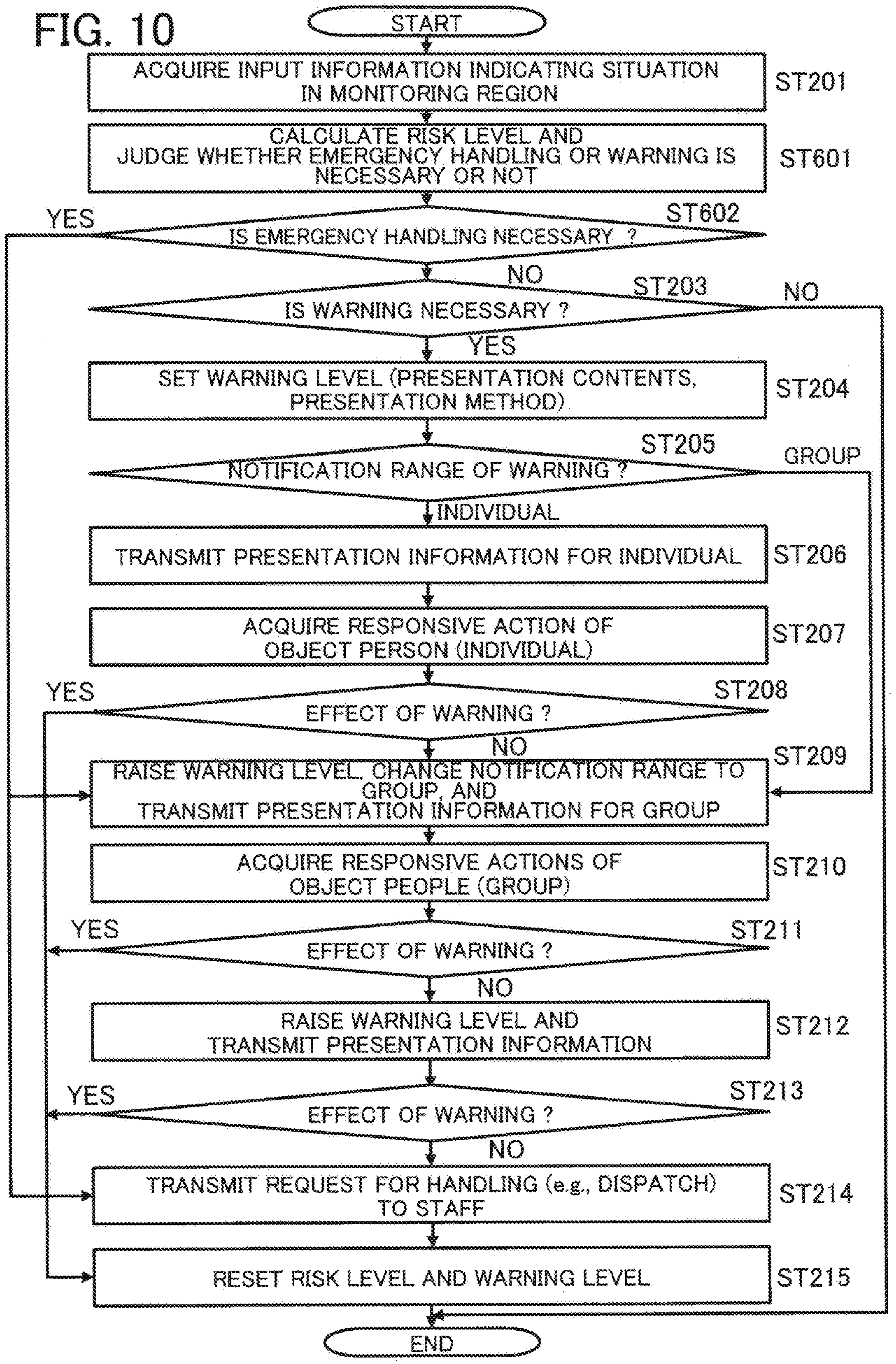
FIG. 10 is a flowchart showing the operation (presentation control method) of a presentation control device according to a sixth embodiment.

FIG. 8 and FIG. 9 are flowcharts showing the operation (presentation control method) of the presentation control device according to the fifth embodiment. In FIG. 8, each step identical or corresponding to a step shown in FIG. 5 is assigned the same reference character as in FIG. 5. In the presentation control device according to the fifth embodiment, when the warning is judged to be unnecessary in the step ST203 in FIG. 8, whether there is the advertisement content for the object people having the detected attribute or not is checked (step ST507 in FIG. 9) and the advertisement content corresponding to the attribute is presented to the object people (step ST508 in FIG. 9) if there is such advertisement content.

In the presentation control device according to the fifth embodiment, when the notification range of the warning is judged to be a group in the step ST205 in FIG. 8, whether there is the warning content for the object people having the detected attribute or not is checked (step ST501 in FIG. 9), the warning content corresponding to the attribute is presented to the object people (step ST502 in FIG. 9) if there is such warning content, and the responsive actions of the object persons (group) are acquired (step ST503 in FIG. 9). When it is judged that there is no such warning content in the step ST501 in FIG. 9, the process advances to the step ST503.

In the next step ST504, the presence/absence of effect of the warning is judged and if there is effect (YES in the step ST504), the risk level and the warning level are reset (step ST506) and thereafter the process advances to the step ST507. In the step ST504, the presence/absence of effect of the warning is judged and if there is no effect (NO in the step ST504), the warning level is raised and the presentation information for the group is transmitted (step ST505) and thereafter the process returns to the step ST502.

According to the fifth embodiment, it is possible to secure the safety by the presentation of the warning information depending on the property of the object person. Further, when the warning presentation is unnecessary, the advertisement information can be presented to the passengers or the like depending on the attribute and an effect of attracting customers to shops in the vicinity of the station can be provided.

Except for the above-described features, the fifth embodiment is the same as the second embodiment.

(6) Sixth Embodiment

In a presentation control device according to a sixth embodiment, the method of the warning is changed depending on an emergency level of the handling. For example, the risk calculation unit judges whether emergency handling is necessary or not (step ST601) and if the emergency handling is necessary (YES in step ST602), a notification is immediately issued to passengers in the vicinity and the staff and the handling is requested. The necessity of the emergency handling can be, for example, occurrence of a sudden illness, occurrence of an accident, necessity of restriction of entry into the station because the platform is about to be overflowing with people, or the like. When the emergency handling is necessary, the process advances to the step ST209 of raising the warning level and changing the notification range to a group and the step ST214 of transmitting the handling request to the staff.

According to the sixth embodiment, it is possible to secure the safety by the presentation of the warning information depending on the property of the object person. Further, when the warning presentation is unnecessary, the advertisement information can be presented to the passengers or the like depending on the attribute and the effect of attracting customers to shops in the vicinity of the station can be provided.

Except for the above-described features, the sixth embodiment is the same as the second embodiment.

(7) Modifications

It is possible to appropriately combine the configurations of the presentation control devices and the information presentation systems according to the above-described first to sixth embodiments.

Further, in the above-described first to sixth embodiments, the monitoring region is not limited to a platform in a station but is applicable also to a different facility such as a facility in a commercial facility, an entertainment facility, a factory, or the like.

(8) Description of Reference Characters

10: information presentation system, 100: presentation control device, 110: risk calculation unit, 111: situation acquisition unit, 112: risk judgment unit, 113: risk judgment model, 120: notification determination unit, 121: presentation model, 130: presentation control unit, 140: response acquisition unit, 210: human detection sensor, 220: staff input unit, 230: environment monitoring unit, 240: mobile terminal, 310: information presentation unit, 311: display device, 312: speaker, 313: lamp (signal light), 314: mobile terminal, 320: mobile terminal, 400: responsive action detection unit.

What is claimed is:

1. A presentation control device comprising:

processing circuitry to acquire input information indicating situations where a group of object persons in a monitoring region is placed, and to calculate a risk level representing a degree of dangerousness of a situation where each of the object persons is placed based on the input information;

to determine presentation contents indicating contents of a warning to the group, a presentation method indicating a method of the warning to the group, and the group of the object persons who should be notified of the warning, based on the risk level of each of the object persons;

to make a presentation device determined based on the presentation method and the group present the presentation contents; and to acquire information indicating actions of the group immediately after the presentation of the presentation contents, as responsive action information, from a responsive action detector detecting actions of the object persons in the monitoring region, wherein when a desired effect of the warning of the presentation contents is not obtained with the group of object persons, the processing circuitry updates the presentation contents, the presentation method, the group, and presentation device, based on the responsive action information.

2. The presentation control device according to claim 1, wherein the processing circuitry calculates the risk level based on the input information which includes one or more items of information out of video information outputted from a monitoring camera, detection information outputted from an object sensor, staff input information outputted from an operation panel operated by a staff, environment information outputted from an environment monitoring device, and information transmitted from a mobile terminal.

3. The presentation control device according to claim 1, wherein the processing circuitry acquires a plurality of items of the input information, and determines the risk level based on the plurality of items of input information and reliability depending on types of the plurality of items of input information.

4. The presentation control device according to claim 1, wherein when the responsive action information includes a situation requiring predetermined preferential handling, the processing circuitry makes emphasized presentation of warning information and a request for dispatch of a staff member.

5. The presentation control device according to claim 1, wherein the processing circuitry changes the presentation method from presentation of a visual warning to presentation of an auditory warning or from presentation of an auditory warning to presentation of a visual warning, based on the responsive action information.

6. The presentation control device according to claim 1, wherein the processing circuitry judges presence or absence of an input requesting emergency handling and when there is a request for the emergency handling, an emergency handling request is transmitted to a device operated by a staff member in regard to the monitoring region.

7. The presentation control device according to claim 1, wherein the responsive action detector includes a monitoring camera detecting actions of the object persons in the monitoring region, and the processing circuitry determines whether the desired effect is not obtained based on whether the actions of the object persons changed before and immediately after the presentation of the warning information.

8. The presentation control device according to claim 1, wherein the responsive action information includes information on each object person regarding at least one action of a rapid change of a direction of a face of each object person, a change of a moving direction of each object person, a stop of walking of each object person, turning around to the face a direction of a display device, a stop of using a smartphone while walking, or taking off headphones and looking around.

9. A presentation control method to be executed by a presentation control device, comprising:

acquiring input information indicating situations where a group of object persons in a monitoring region is placed, and to calculate a risk level representing a degree of dangerousness of a situation where each of the object persons is placed based on the input information;

determining presentation contents indicating contents of a warning to the group, a presentation method indicating a method of the warning to the group, and the group of the object persons who should be notified of the warning, based on the risk level of each of the object persons;

making a presentation device determined based on the presentation method and the group present the presentation contents;

acquiring information indicating actions of the group immediately after the presentation of the presentation contents, as responsive action information, from a responsive action detector detecting actions of the object persons in the monitoring region; and when a desired effect of the warning of the presentation contents is not obtained with the group of object persons, updating the presentation contents, the presentation method, the group, and presentation device, based on the responsive action information.

10. A non-transitory computer-readable storage medium storing a presentation control program that causes a computer to execute:

acquiring input information indicating situations where a group of object persons in a monitoring region is placed, and to calculate a risk level representing a degree of dangerousness of a situation where each of the object persons is placed based on the input information;

determining presentation contents indicating contents of a warning to the group, a presentation method indicating a method of the warning to the group, and the group of the object persons who should be notified of the warning, based on the risk level of each of the object persons;

making a presentation device determined based on the presentation method and the group present the presentation contents;

acquiring information indicating actions of the group immediately after the presentation of the presentation contents, as responsive action information, from a responsive action detector detecting actions of the object persons in the monitoring region; and when a desired effect of the warning of the presentation contents is not obtained with the group of object persons, updating the presentation contents, the presentation method, the group, and presentation device, based on the responsive action information.

* * * * *